(12) United States Patent
Pandey

(10) Patent No.: US 11,178,074 B2
(45) Date of Patent: Nov. 16, 2021

(54) COMMUNICATIONS DEVICE AND METHOD OF COMMUNICATIONS

(71) Applicant: NXP B.V., Eindhoven (NL)

(72) Inventor: Sujan Pandey, Waalre (NL)

(73) Assignee: NXP B.V., Eindhoven (NL)

( * ) Notice: Subject to any disclaimer, the term of this patent is extended or adjusted under 35 U.S.C. 154(b) by 47 days.

(21) Appl. No.: 16/593,403

(22) Filed: Oct. 4, 2019

(65) Prior Publication Data

US 2021/0105229 A1  Apr. 8, 2021

(51) Int. Cl.
*H04L 12/937* (2013.01)
*H04L 29/06* (2006.01)
*H04L 29/12* (2006.01)

(52) U.S. Cl.
CPC ........ *H04L 49/253* (2013.01); *H04L 61/2038* (2013.01); *H04L 69/22* (2013.01)

(58) Field of Classification Search
CPC .... H04L 49/253; H04L 61/2038; H04L 69/22
See application file for complete search history.

(56) References Cited

U.S. PATENT DOCUMENTS

| | | | |
|---|---|---|---|
| RE45,009 E | 7/2014 | Vange et al. | |
| 2003/0235209 A1 | 12/2003 | Garg et al. | |
| 2006/0235939 A1 | 10/2006 | Yim | |
| 2016/0261558 A1 | 9/2016 | Herrero | |
| 2018/0041614 A1* | 2/2018 | Ben-Chen | H04L 45/741 |
| 2018/0287815 A1* | 10/2018 | Yamamoto | H04L 12/4625 |
| 2018/0376516 A1 | 12/2018 | Brandlamuni | |
| 2019/0268420 A1* | 8/2019 | Acharya | H04L 63/0823 |
| 2020/0120458 A1* | 4/2020 | Aldana | H04W 36/08 |
| 2020/0125858 A1* | 4/2020 | Bauer | G05D 1/0088 |
| 2021/0105347 A1 | 4/2021 | Pandey | |

OTHER PUBLICATIONS

Non-Final Rejection for U.S. Appl. No. 16/593,807, 14 pgs, (dated Feb. 12, 2021).
Final Rejection for U.S. Appl. No. 16/593,807, 16 pgs. (dated Mar. 26, 2021).
Non-Final Rejection for U.S. Appl. No. 16/593,807, 16 pgs., (dated Sep. 17, 2021).

* cited by examiner

*Primary Examiner* — Shailendra Kumar

(57) ABSTRACT

Embodiments of a device and method are disclosed. In an embodiment, a method of communications involves allocating communications devices of a wired communications network to clusters, assigning addresses to the clusters, where each communications device within one of the clusters has an identical address, and conducting communications between the communications devices based on the addresses assigned to the clusters.

20 Claims, 17 Drawing Sheets

| PORT(a) | PORT(b) | PORT(c) | PORT(d) |
|---------|---------|---------|---------|
| CSI | USB | HDMI | TO OTHER COMMUNICATIONS NODE |

COMMUNICATIONS DEVICE AND METHOD OF COMMUNICATIONS

BACKGROUND

In a communications network with limited resources, it is generally desirable to have a network technology with reduced communications complexity and efficient power and/or communications bandwidth utilization. For example, in an in-vehicle network (IVN) (e.g., with sensor nodes such as cameras, radars, and/or light detection and ranging (Li-DAR) sensors) where power supply and communications bandwidth can be limited and the dimension and cost of network components are typically constrained, a network technology with reduced communications complexity and efficient power and bandwidth utilization can improve network lifetime, reduce power consumption and/or increase communications efficiency. However, typical network technology may not be able to provide reduced communications complexity and efficient power and bandwidth utilization that are suitable for a wide range of applications. For example, Ethernet is a well-known network technology and the Institute of Electrical and Electronic Engineers (IEEE) 802.3 Working Group is providing a collection of standards that define physical layer and data link layer media access control (MAC) for wired Ethernet. However, an Ethernet frame includes a header that contains source and destination MAC addresses, which can cause increased communications complexity and packet overhead. Therefore, there is a need for a network technology that has reduced communications complexity and efficient power and/or communications bandwidth utilization.

SUMMARY

Embodiments of a device and method are disclosed. In an embodiment, a method of communications involves allocating communications devices of a wired communications network to clusters, assigning addresses to the clusters, where each communications device within one of the clusters has an identical address, and conducting communications between the communications devices based on the addresses assigned to the clusters.

In an embodiment, each of the communications devices allocated to each of the clusters communicates according to a unique communications protocol.

In an embodiment, at least one of the clusters includes at least two of the communications devices that communicate according to different communications protocols.

In an embodiment, at least one of the clusters includes an electronic control unit (ECU), and the wired communications network is an IVN.

In an embodiment, allocating the communications devices of the wired communications network to the clusters includes, for each of a plurality of communications protocols used within the wired communications network, determining a total device count of communications device or communications devices within the wired communications network communicating according to the same communications protocol.

In an embodiment, allocating the communications devices of the wired communications network to the clusters further includes selecting a highest device count among the total device counts as the number of clusters for the wired communications network.

In an embodiment, assigning the addresses to the clusters includes assigning a unique identification number to each of the clusters.

In an embodiment, allocating the communications devices of the wired communications network to the clusters further includes allocating, to each of the clusters, one communications device that communicates according to a communications protocol with the highest device count.

In an embodiment, allocating the communications devices of the wired communications network to the clusters further includes allocating, to at least one of the clusters, a second communications device that communicates according to a second communications protocol, and the second communications protocol is different from the communications protocol with the highest device count.

In an embodiment, conducting communications between the communications devices based on the addresses assigned to the clusters includes receiving a packet from a first cluster of the clusters at a first port of one of the communications devices, and where a header of the packet includes an address of a second cluster of the clusters and a communications protocol according to which a destination communications device in the second cluster communicates.

In an embodiment, conducting communications between the communications devices based on the addresses assigned to the clusters further includes, based on the communications protocol and a port-to-protocol lookup table, transmitting the packet or a payload within the packet from the first port to a second port of the one of the communications devices to which the destination communications device is connected.

In an embodiment, conducting communications between the communications devices based on the addresses assigned to the clusters includes conducting communications between the communications devices based on the addresses assigned to the clusters asymmetrically such that communications in one direction occur at a first rate that is higher than a second rate at which communications in an opposite direction occurs.

In an embodiment, a communications device includes ports and at least one communications unit configured to at a first port of the ports, receive a packet, where a header of the packet includes an address of a destination cluster within a communications network and a communications protocol according to which a destination communications device in the destination cluster communicates, and, based on the communications protocol and a port-to-protocol lookup table, transmit the packet or a payload within the packet from the first port to a second port of the ports to which the destination communications device is connected.

In an embodiment, the at least one communications unit is further configured to extract the payload within the packet and create a second packet in accordance with the communications protocol using the payload.

In an embodiment, a wired communications network includes a wired transmission media and communications devices configured to communicate via the wired transmission media. The communications devices are allocated to a plurality of clusters, wherein each of the communications devices allocated to one of the clusters communicates according to a unique communications protocol, addresses are assigned to the clusters, each communications device within each of the clusters has an identical address, and communications are conducted between the communications devices based on the addresses assigned to the clusters.

In an embodiment, at least one of the clusters includes at least two of the communications devices that communicate according to different communications protocols.

In an embodiment, at least one of the clusters includes an ECU of the communications devices, and the wired communications network is an IVN.

In an embodiment, at least one of the communications devices is configured to, at a first port, receive a packet from a first cluster of the clusters, and where a header of the packet includes an address of a second cluster of the clusters and a communications protocol according to which a destination communications device in the second cluster communicates.

In an embodiment, the at least one of the communications devices is further configured to, based on the communications protocol and a port-to-protocol lookup table, transmit the packet or a payload within the packet from the first port to a second port of the at least one of the communications devices to which the destination communications device is connected.

In an embodiment, communications is conducted in the wired communications network asymmetrically such that communications in one direction occur at a first rate that is higher than a second rate at which communications in an opposite direction occurs.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 12 depicts a port-to-protocol lookup table that can be used for packet forwarding in the communications network depicted in FIG. 11.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
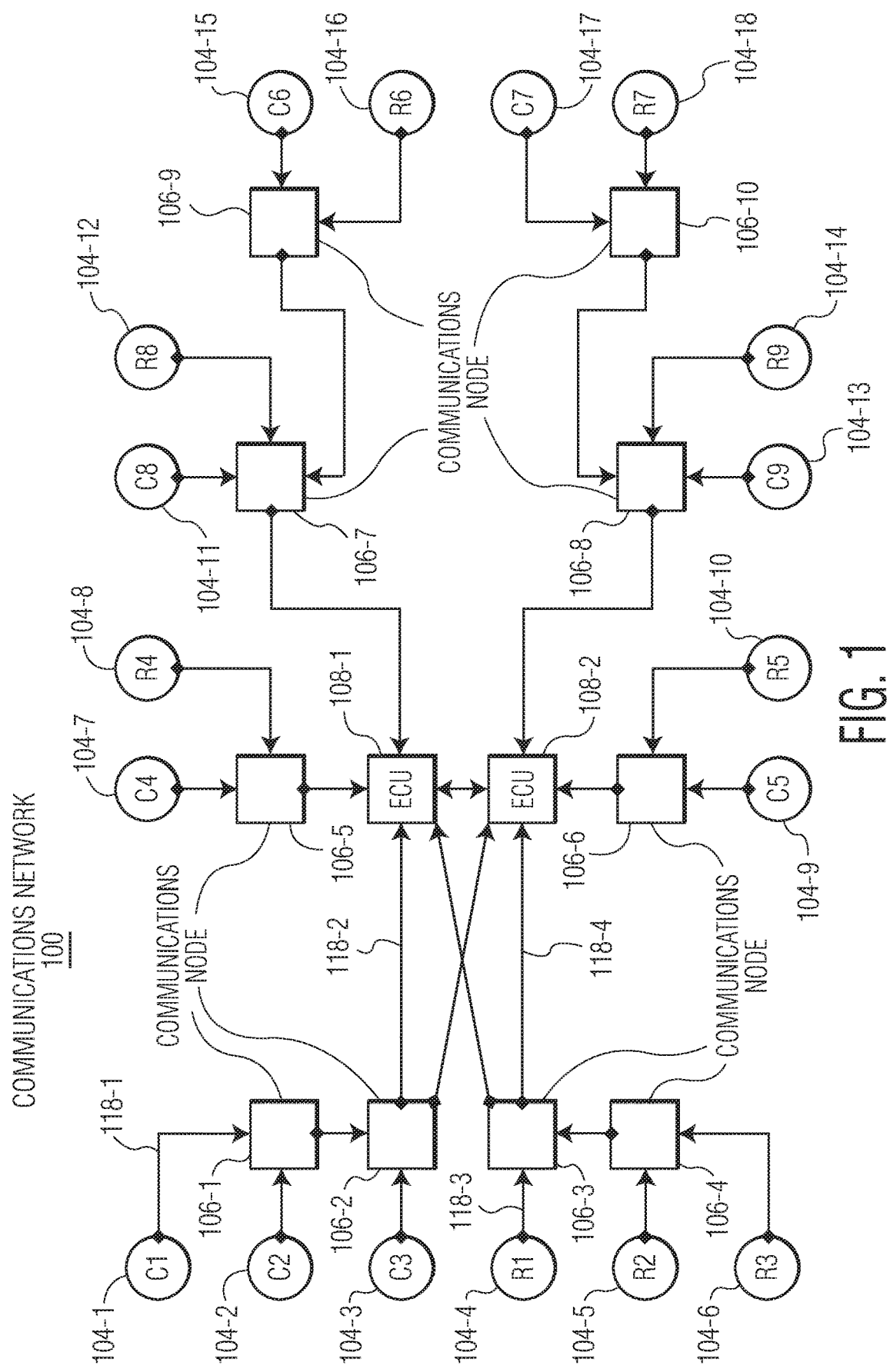
FIG. 1 depicts a communications network that includes multiple sensor nodes, communications nodes, and electronic control units (ECUs).

FIG. 1 depicts a communications network 100 that includes one or more sensor nodes 104-1, 104-2, . . . , 104-18, one or more communications nodes 106-1, 106-2, . . . , 106-10, and one or more electronic control units (ECUs) 108-1, 108-2. The communications network can be used in various applications, such as automotive applications, communications applications, industrial applications, medical applications, computer applications, and/or consumer or appliance applications. In some embodiments, the communications network is a wired communications network and the sensor nodes, the communications nodes, and the ECUs communicate through electrical cables or wires, which are made of conductive materials (e.g., metals). For example, the sensor nodes, the communications nodes, and the ECUs communicate through one or more coaxial cables, twisted pair cables, or fiber optic cables. Although the illustrated communications network 100 is shown with certain components and described with certain functionality herein, other embodiments of the communications network may include fewer or more components to implement the same, less, or more functionality. For example, the communications network may include at least one actuator and/or at least one display. In another example, in some embodiments, the communications network may include more than eighteen sensor nodes or less than eighteen sensor nodes, more than ten communications nodes or less than ten communications nodes, and/or more than two ECUs or less than two ECUs. In another example, although the sensor nodes, the communications nodes, and the ECUs are shown in FIG. 1 as being connected in certain topology, the network topology of the communications network is not limited to the topology shown in FIG. 1. Examples of network topology that can also be used by the communications network includes, without being limited to, point-to-point, star, bus, ring or circular, mesh, tree, or hybrid. For example, the sensor nodes, the communications nodes, and the ECUs can communicate through a communications bus, which carries analog differential signals and includes a high bus line and a low bus line, which may be connected between one or more resistors.

In the embodiment depicted in FIG. 1, the sensor nodes 104-1, 104-2, . . . , 104-18 are configured to sense environmental or operational parameters or data, for example, within a vehicle and/or surrounding a vehicle. In some embodiments, the sensor nodes are configured to sense environmental or operational parameters or data within an automotive system (e.g., a vehicle) and/or surrounding an automotive system. The environmental or operational parameters or data gathered by the sensor nodes can be in any suitable format. Examples of the sensor nodes include, without being limited to, image sensors/cameras, video sensors/cameras, capacitance sensors, inductive sensors, pressure sensors, thermal or temperature sensors (e.g., infrared thermometers), position sensors (e.g., altimeters, gyroscopes, LiDAR sensors), proximity or presence sensors (e.g., motion detectors, radars (e.g., Doppler radars)), vibration sensors, acoustic sensors, optical sensors, moisture sensors, humidity sensors, fluid property sensors (e.g., flow sensors), voltage sensors, current sensors, and chemical sensors. In some embodiments, the sensor nodes are automotive sensors, such as air flow meters, air-fuel ratio meters, blind spot monitors, crankshaft position sensors, engine coolant temperature sensors, hall effect sensors, wheel speed sensors, airbag sensors, automatic transmission speed sensors, brake fluid pressure sensors, camshaft or crankshaft position sensors, cylinder head temperature gauges, engine pressure sensors, exhaust gas temperature sensors, fuel level sensors, fuel pressure sensors, light sensors, oil level sensors, oxygen sensors, radars, speed sensors, throttle position sensors, tire pressure sensors, torque sensors, transmission fluid temperature sensors, turbine speed sensors, variable reluctance sensors, wheel speed sensors, anti-lock braking system (ABS) sensors and/or battery sensors. Although the sensor nodes are illustrated in FIG. 1 as being certain types of sensors (e.g., cameras C1, C2, C3, C4, C5, C6, C7, C8, and C9, and radars R1, R2, R3, R4, R5, R6, R7, R8, and R9), in other embodiments, the sensor nodes are implemented as other types of sensors.

In the embodiment depicted in FIG. 1, the communications nodes 106-1, 106-2, . . . , 106-10 are configured to transmit and receive data. The data transmitted and received by the communications nodes can be in any suitable format. In an embodiment, the data transmitted and received are data frames. In addition to communication, each of the communications nodes may be configured to perform an application such as an automotive application. In some embodiments, at least one of the communications nodes is implemented as a switch or a daisy chain node that can be serially connected with other daisy chain node to form a daisy chain network. In the daisy chain network, data is serially transmitted uplink or downlink through daisy chain nodes. For example, when a first daisy chain node receives data from a second daisy chain node, the first daisy chain node can forward the received data to a third daisy chain node. Although the communications network is illustrated in FIG. 1 as including ten communications nodes, in other embodiments, the communications network includes more than ten communications nodes or less than ten communications nodes.

In the embodiment depicted in FIG. 1, the ECUs 108-1, 108-2 are configured to control one or more devices, such as the sensor nodes 104-1, 104-2, . . . , 104-18 and/or the communications nodes 106-1, 106-2, . . . , 106-10, and/or process data received from one or more devices, such as the sensor nodes 104-1, 104-2, . . . , 104-18 and/or the communications nodes 106-1, 106-2, . . . , 106-10. The ECUs can be used in various applications, such as automotive applications, communications applications, industrial applications, medical applications, computer applications, and/or consumer or appliance applications. In some embodiments, the ECUs 108-1, 108-2 are configured to control one or more electronic components within an automobile system such as a vehicle. Each ECU may collect data from one or more sensor nodes, run application software, control one or more actuators, and/or communicate to other ECU via the communication network. In these embodiments, the ECUs include at least one engine control module (ECM), at least one power train control module (PCM), at least one airbag, at least one antilock brake, at least one cruise control module, at least one electric power steering module, at least one audio system module, at least one window control module, at least one door control module, at least one mirror adjustment module, and/or at least one battery and/or recharging system for electrical or hybrid automotive systems. Although the communications network is illustrated in FIG. 1 as including two ECUs, in other embodiments, the communications network includes more than two ECUs or less than two ECUs.

Figure 2:
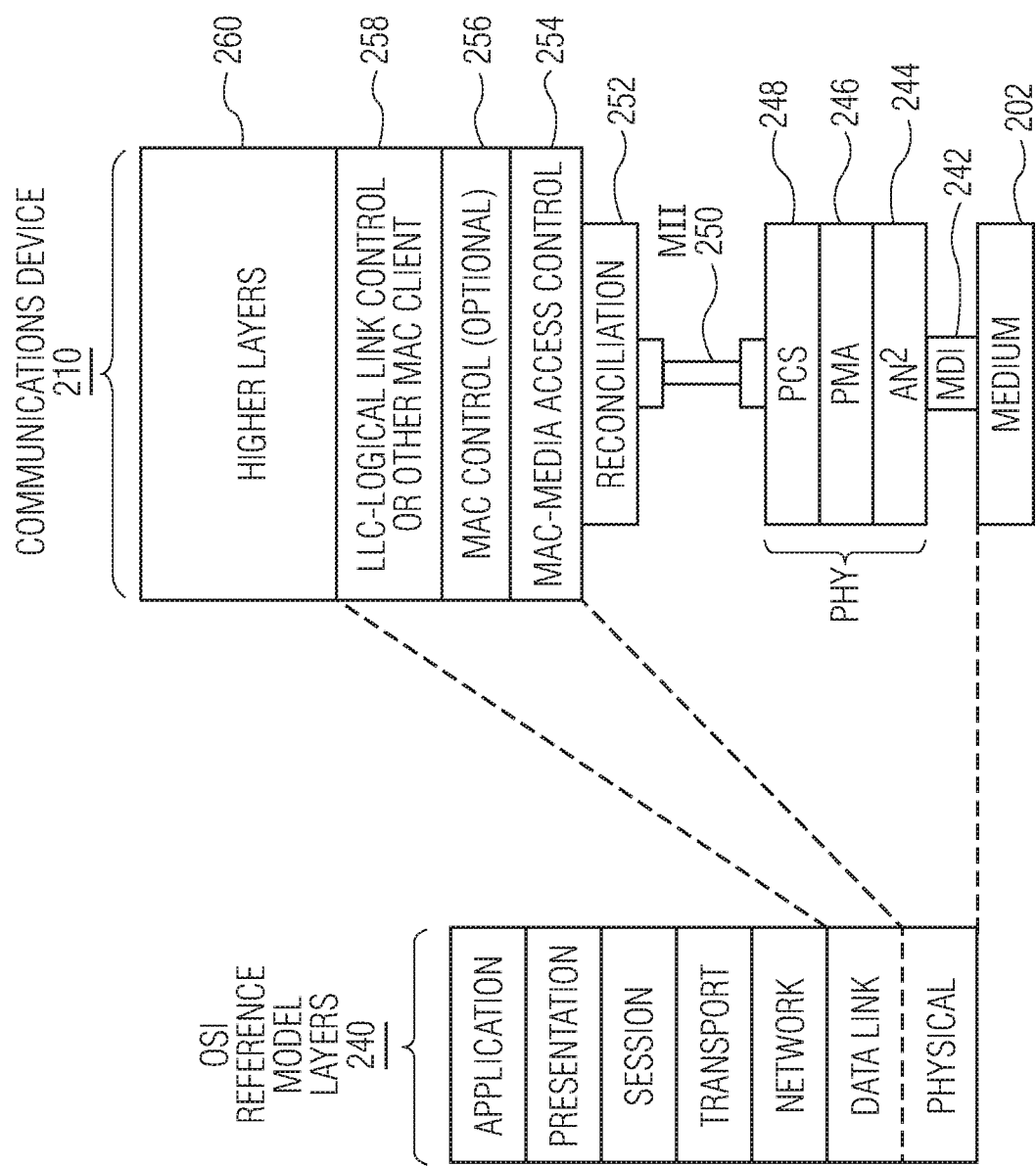
FIG. 2 depicts a communications node and an OSI reference model.

FIG. 2 illustrates a communications device 210 that can be used in the communications network 100. FIG. 2 also depicts the layers of the OSI reference model 240 as well as an expanded view of the physical layer and the data link layer. The communications device depicted in FIG. 2 is an embodiment of the sensor nodes 104-1, 104-2, . . . , 104-18, the communications nodes 106-1, 106-2, . . . , 106-10, and/or the ECUs 108-1, 108-2 depicted in FIG. 1. However, the sensor nodes, the communications nodes, and/or the ECUs depicted in FIG. 1 are not limited to the embodiment shown in FIG. 2. As shown in FIG. 2, the OSI reference model includes the physical layer (also referred to as layer 1 or L1), the data link layer (also referred to as layer 2 or L2), the network layer (also referred to as layer 3 or L3), the transport layer (also referred to as layer 4 or L4), the session layer (also referred to as layer 5 or L5), the presentation layer (also referred to as layer 6 or L6), and the application layer (also referred to as layer 7 or L7). Elements in the expanded view of the physical layer include media-dependent sublayers of a transmission medium or media 202, a media-dependent interface (MDI) 242, an auto-negotiation layer (AN2) 244, a physical medium attachment (PMA) 246, and a physical coding sublayer (PCS) 248, and media-independent sublayers of a media-independent interface (MII) 250 (e.g., reduced media-independent interface (RMII), gigabit media-independent interface (GMII), reduced gigabit media-independent interface (RGMII), 10-gigabit media-independent interface (XGMII) and serial gigabit media-independent interface (SGMII), etc., referred to collectively as "xMII"), and a reconciliation sublayer 252. In an embodiment, elements of the PCS, PMA, and AN2 are included in a physical layer chip, often referred to as a "PHY chip" and or simply as a "PHY" as indicated in FIG. 2. Elements in the expanded view of the data link layer include a media access control (MAC) layer 254, an optional MAC control layer 256, and a logical link control (LLC) 258, or other MAC client layer. Higher layers 260 may be implemented above the data link layer.

Figure 3:
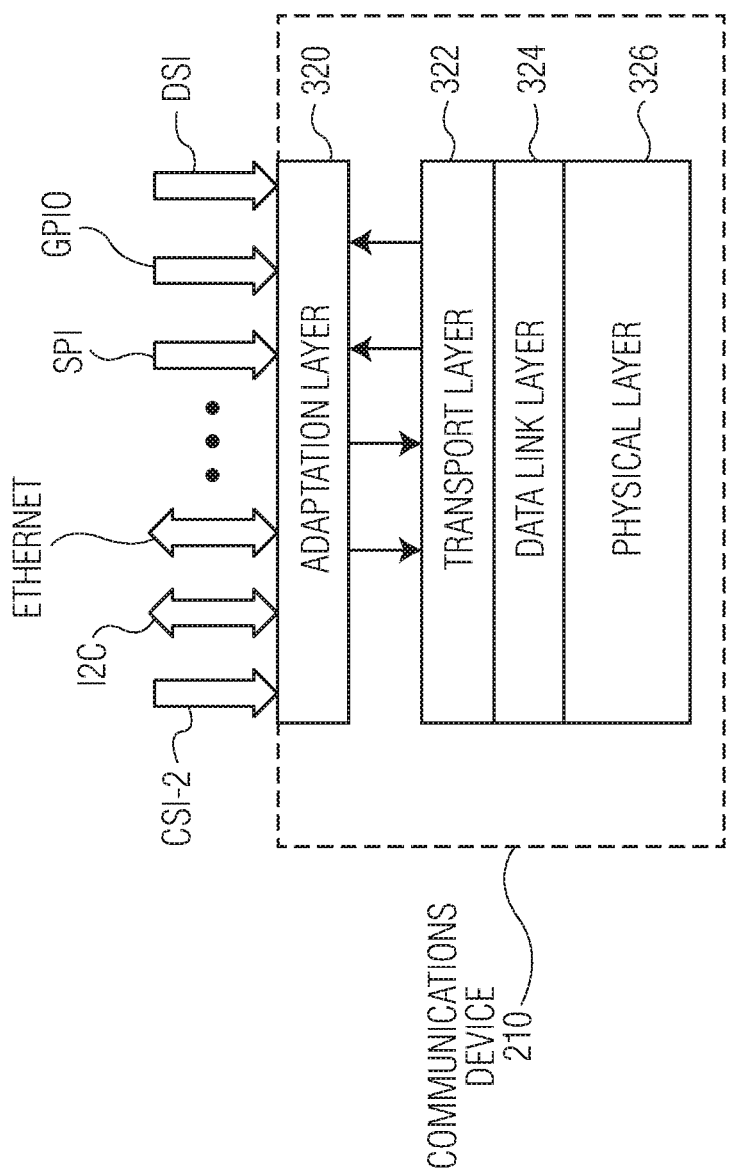
FIG. 3 illustrates a tunneling technique of the communications device depicted in FIG. 2.

FIG. 3 illustrates a tunneling technique of the communications device 210 depicted in FIG. 2. As illustrated in FIG. 3, an adaptation layer 320 within the communications device 210 allows data in different protocol formats to tunnel through the communications device by generating packets for all supported protocol formats. In some embodiments, the adaptation layer fragments each received data frame or packet if necessary, assigns a protocol type for each fragment, and assigns a packet counter field start and end value to each protocol type. In some embodiments, the functionality of the adaptation layer is implemented in hardware (e.g., circuits), software, firmware, or a combination thereof. Examples of protocol formats that can be supported by the adaption layer include, without being limited to, Camera Serial Interface (CSI), Camera Serial Interface 2 (CSI-2), Inter-integrated Circuit (I2C) Protocol, Ethernet, Serial Peripheral Interface (SPI), general-purpose input/output (GPIO), and Display Serial Interface (DSI). Transport layer 322 forwards packets from the adaptation layer to the data link layer. Data link layer 324 checks for error in received packets and establishes a communications links with a partner device using, for example, Start of Packet (SoP) and End of Packet (EoP) signals. Physical layer 326 transmits and receives data from other devices.

Figure 4:
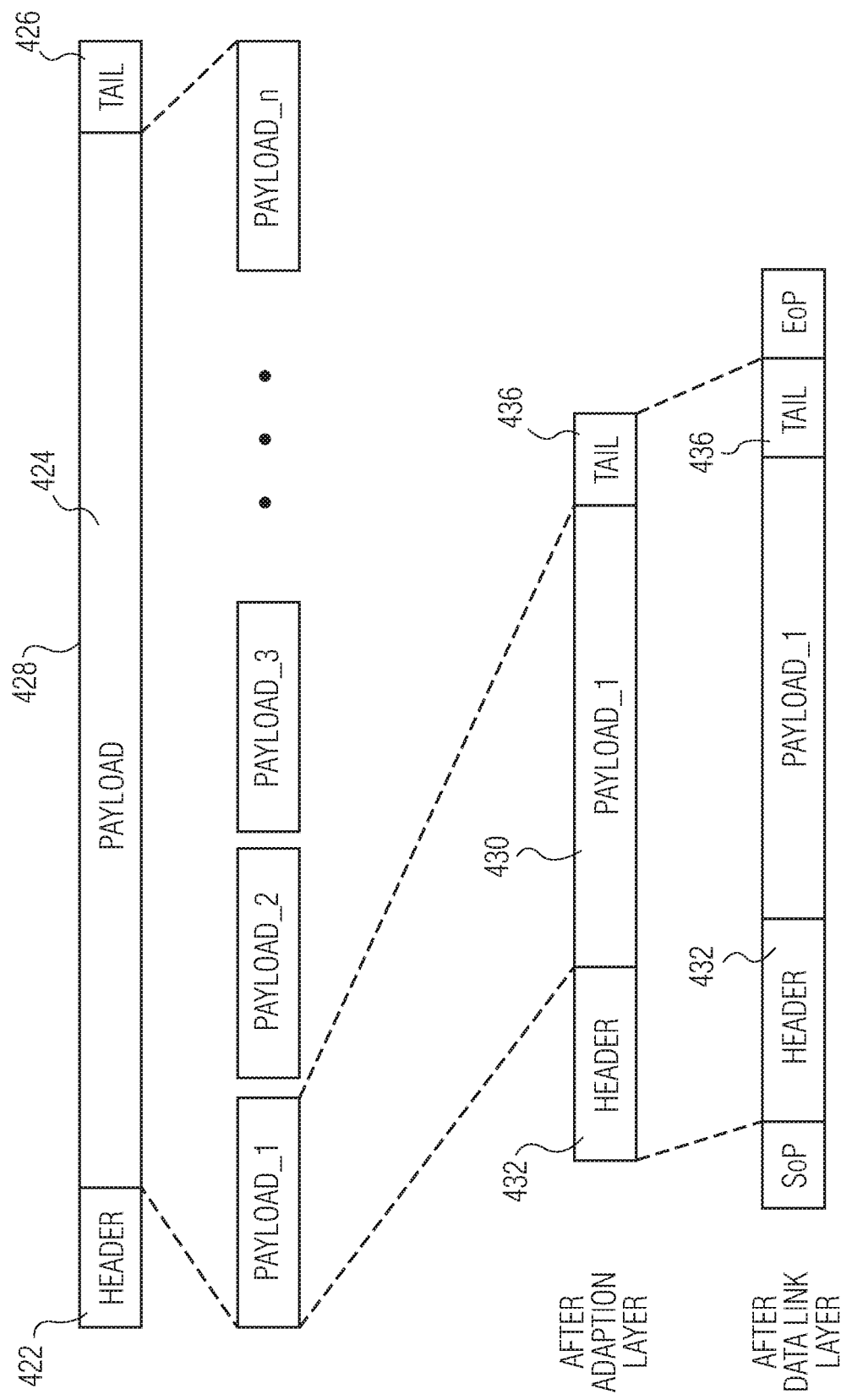
FIG. 4 illustrates a packet generation operation that can be performed by the communications device depicted in FIG. 2 using the tunneling technique illustrated in FIG. 3.

FIG. 4 illustrates a packet generation operation that can be performed by the communications device 210 depicted in FIG. 2 using the tunneling technique illustrated in FIG. 3. As illustrated in FIG. 4, payload 424 of a data structure 428 (also includes a header 422 and a tail section 426) that is transmitted, generated, and/or encoded according to a certain protocol (e.g., in a certain protocol format) is packaged into a packet 430 with a header 432 and a tail section 436. Examples of information that can be included in the header or the tail section include, without being limited to, protocol type information, address information, packet counter, priority information and error-detecting code (e.g., cyclic redundancy check (CRC)). For example, each payload segment, payload_1, payload_2, payload_3, . . . , or payload_N (where N is an integer greater than 1) of the data structure 428 (e.g., a frame according to CSI-2, I2C, Ethernet, SPI, GPIO, or DSI), is re-packaged by the adaptation layer 320 with the header 432 and the tail section 436 to generate the packet 430. At the data link layer 324, SoP and EoP values are inserted into the packet 430 that is generated by the adaptation layer.

Although the sensor nodes 104-1, 104-2, . . . , 104-18, the communications nodes 106-1, 106-2, . . . , 106-10, and the ECUs 108-1, 108-2 of the communications network 100 are shown in FIG. 1 as being connected in a mesh type topology, the network topology of the communications network 100 is not limited to the topology shown in FIG. 1. In some embodiments, two of sensor nodes, communications nodes, and/or ECUs are connected by a point-to-point connection without any intervening device. The header of a packet may contain packet type information that indicates a network connection in which the packet is used. In some embodiments, the header of a packet contains packet type information that indicates a point-to-point connection in which the packet is used. For example, packet type information may indicate that a packet is used for communications between a sensor node and a communications node. When a packet is used for communications in a point-to-point connection, the source node and the destination node are known to each other. Consequently, address information (e.g., a source address and/or a destination address) is not required in the header of the packet. When the header of the packet does not include address information (e.g., a source address and/or a destination address), the size of the packet and communications overhead is reduced and, as a result, power consumption for packet communications is reduced.

Figure 5:
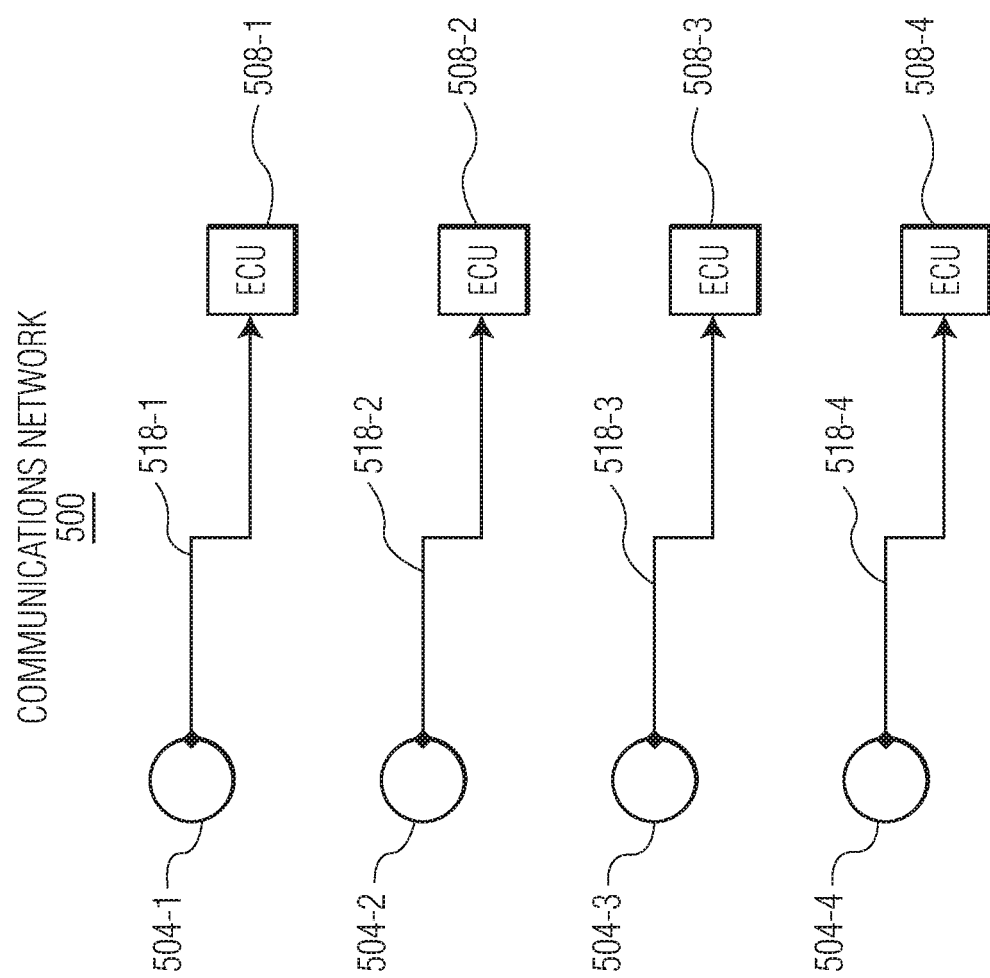
FIG. 5 depicts a communications network with point-to-point connections.

FIG. 5 depicts a communications network 500 that includes sensor nodes 504-1, 504-2, 504-3, 504-4, and ECUs 508-1, 508-2, 508-3, 508-4 that are connected to the sensor nodes by point-to-point connections 518-1, 518-2, 518-3, 518-4. In the embodiment depicted in FIG. 5, each of the sensor nodes 504-1, 504-2, 504-3, 504-4 is connected to the corresponding ECU 508-1, 508-2, 508-3, or 508-4 in the point-to-point connection 518-1, 518-2, 518-3, or 518-4, respectively.

Figure 6:
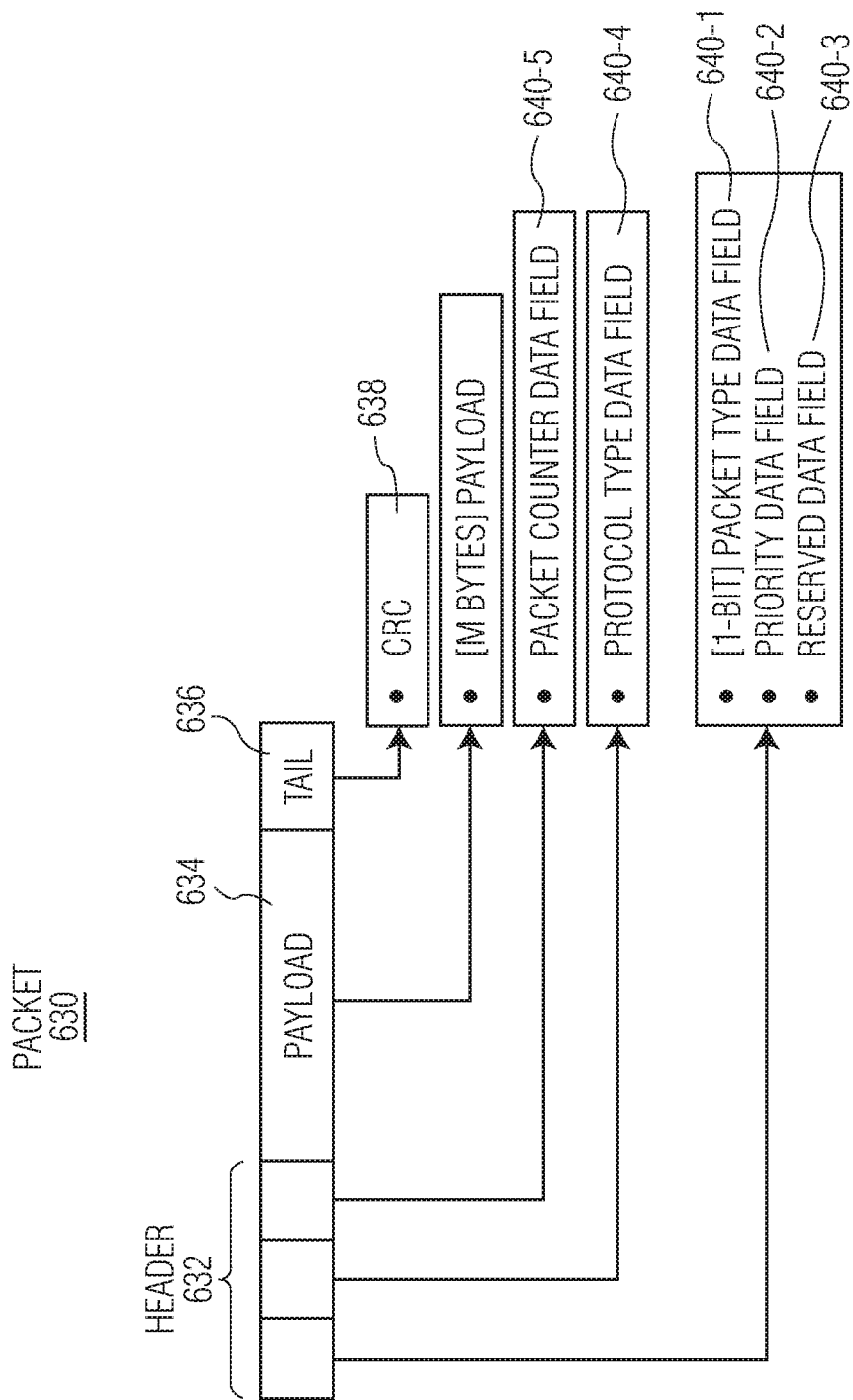
FIG. 6 depicts a packet that can be used in a point-to-point connection in accordance with an embodiment of the invention.

FIG. 6 depicts a packet 630 that can be used in a point-to-point connection in accordance with an embodiment of the invention. As depicted in FIG. 6, the packet includes a header 632, a payload 634, and a tail section 636. In the embodiment depicted in FIG. 6, the header of the packet does not include address information (e.g., a source address and/or a destination address) because the source node and the destination node are known to each other. Consequently, the size of the packet and communications overhead is reduced and, as a result, power consumption for packet communications is reduced. For example, the packet may be used for communications between a sensor node and a corresponding ECU (e.g., in the point-to-point connection 518-1 between the sensor node 504-1 and the ECU 508-1, the point-to-point connection 518-2 between the sensor node 504-2 and the ECU 508-2, the point-to-point connection 518-3 between the sensor node 504-3 and the ECU 508-3, or the point-to-point connection 518-4 between the sensor node 504-4 and the ECU 508-4 depicted in FIG. 5), and the source node and the destination node are known to each other. As depicted in FIG. 6, the header includes a packet type data field 640-1 that indicates a network connection in which the packet is used, a priority data field 640-2 that indicates a priority level of the packet, a reserved data field 640-3, a protocol type data field 640-4 that indicates a protocol according to which the packet is transmitted, and a packet counter data field 640-5 that indicates a packet counter value or a packet sequence value. In some embodiments, the packet counter data field can be used as a timestamp from a transmitting device or to determine if a particular packet is lost. In the embodiment depicted in FIG. 6, the packet type data field has a size of one bit. For example, a packet type value of 0 indicates that the packet is used in a point-to-point connection while a packet type value of 1 indicates that the packet is used in a point-to-multipoint connection or a broadcast connection. In another example, a packet type value of 1 indicates that the packet is used in a point-to-point connection while a packet type value of 0 indicates that the packet is used in a point-to-multipoint connection or a broadcast connection. Although the packet type data field is shown in FIG. 6 as having a size of one bit, in other embodiments, the packet type data field has a size of more than one bit. The payload includes payload data of M bytes (M being an integer greater than one) although one byte or less payload is also possible. The tail section 636 includes CRC 638 of one or more bits.

In some embodiments, the header of a packet contains packet type information that indicates a broadcast connection or a point-to-multipoint connection in which the packet is used. For example, packet type information may indicate that a packet is used for communications between different communications nodes (e.g., between the communications node 106-1 and the communications node 106-2) or between a communication node and an ECU (e.g., between the communications node 106-2 and the communications node 108-1). When a packet is used for communications in a broadcast connection or a point-to-multipoint connection, the source node and the destination node are not known to each other and the header of the packet includes address information (e.g., a source address and/or a destination address).

Figure 7:
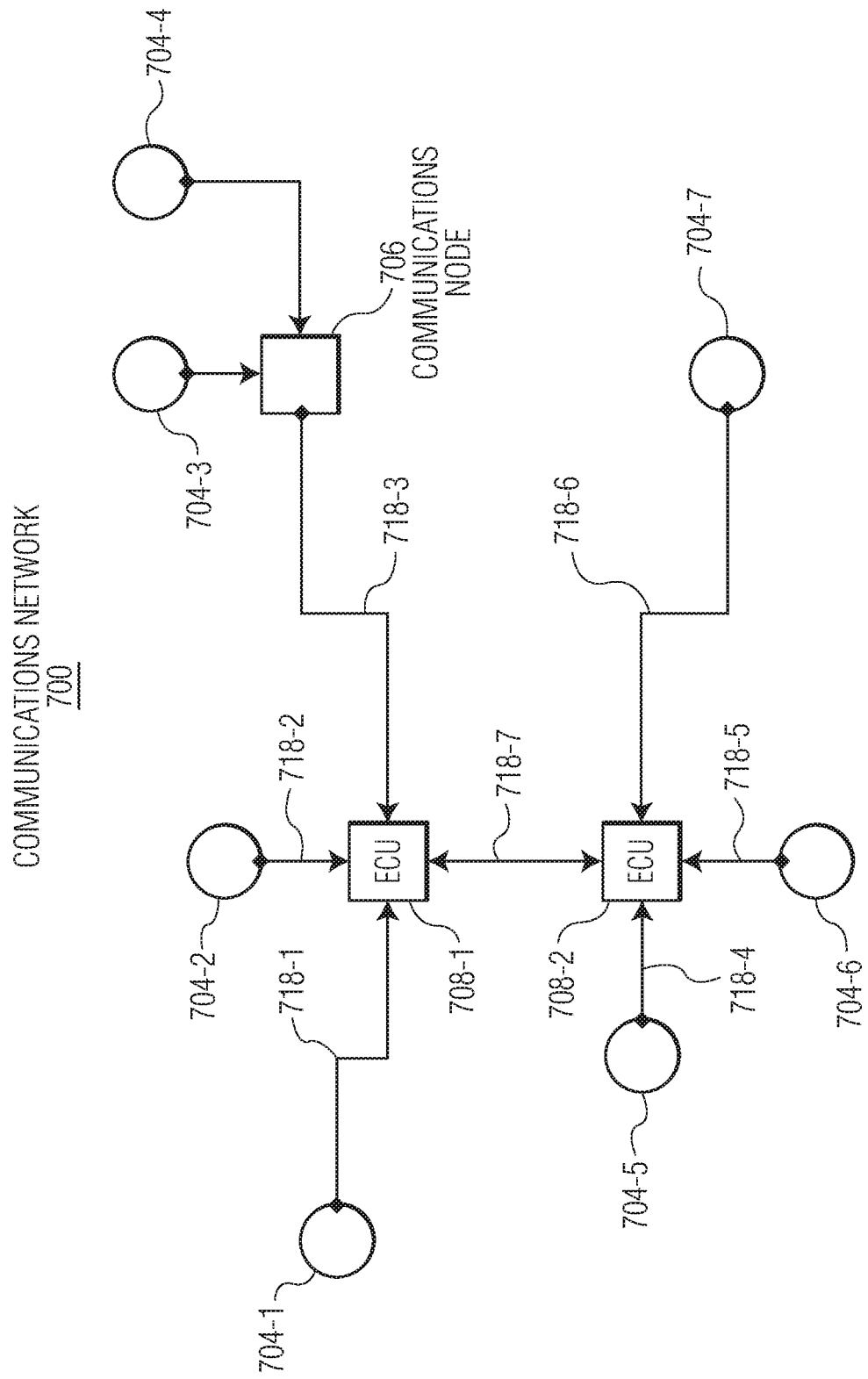
FIG. 7 depicts a communications network with broadcast connections.

FIG. 7 depicts a communications network 700 that includes sensor nodes 704-1, 704-2, . . . , 704-7, a communications node 706, and ECUs 708-1, 708-2 that are connected by broadcast connections. In the embodiment depicted in FIG. 7, the ECU 708-1 is connected to the sensor nodes 704-1, 704-2, the communications node 706, and the ECU 708-2 through connections 718-1, 718-2, 718-3, 718-4, respectively. The ECU 708-2 is connected to the sensor nodes 704-5, 704-6, 704-7 and the ECU 708-1 through connections 718-4, 718-5, 718-6, 718-7, respectively.

Figure 8:
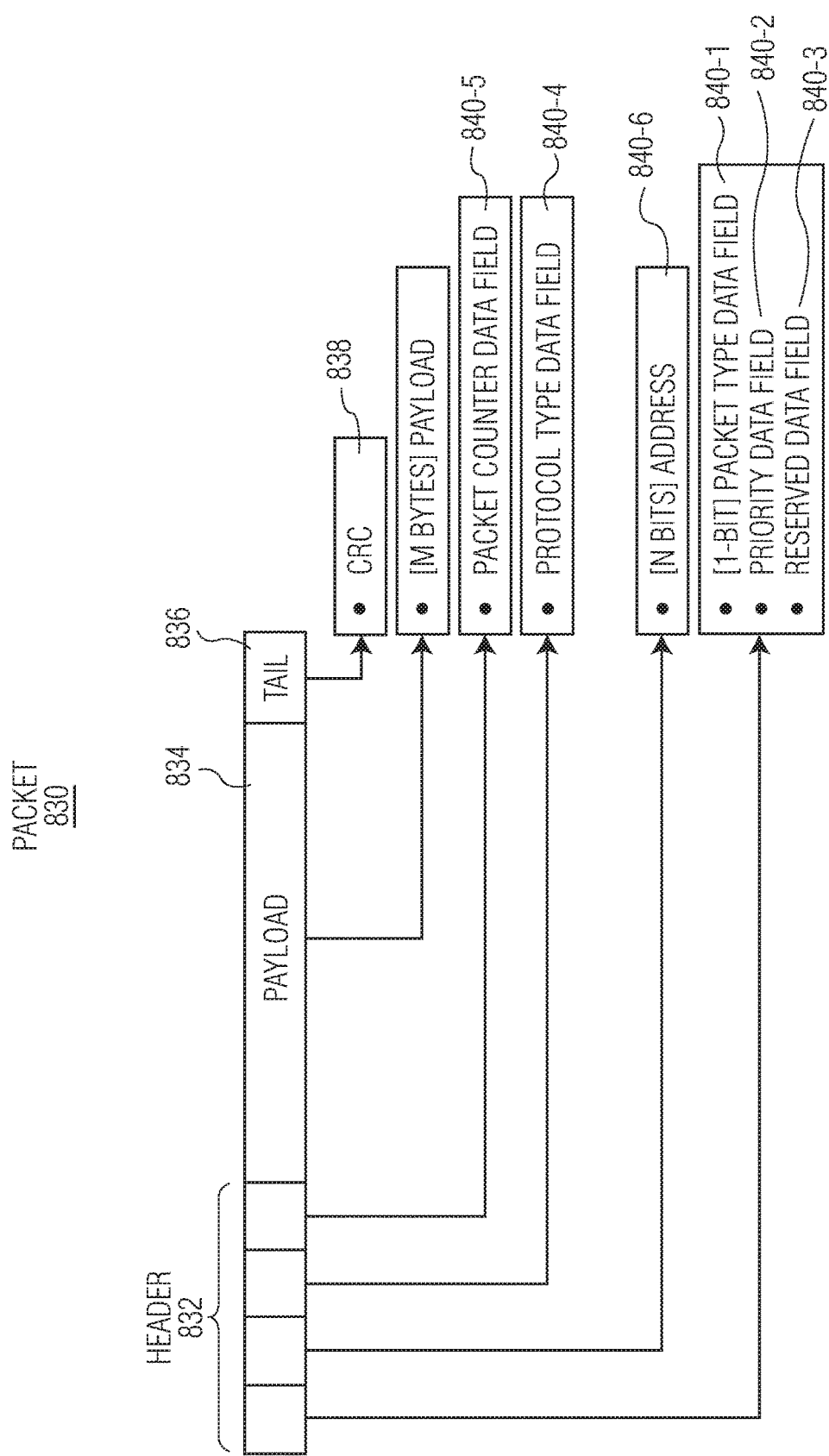
FIG. 8 depicts a packet that can be used in a broadcast connection in accordance with an embodiment of the invention.

FIG. 8 depicts a packet 830 that can be used in a broadcast connection or a point-to-multipoint connection in accordance with an embodiment of the invention. As depicted in FIG. 8, the packet 830 includes a header 832, a payload 834, and a tail section 836. In the embodiment depicted in FIG. 8, the header of the packet includes an address data field 840-6 that contains address information (e.g., a source address and/or a destination address) to indicate a source and/or a destination of the packet. For example, the packet may be used for communications in a network with broadcast connections (e.g., in the connections 718-1, 718-2, . . . , 718-7 depicted in FIG. 7). As depicted in FIG. 8, the header includes a packet type data field 840-1 that indicates a network connection in which the packet is used, a priority data field 840-2 that indicates priority of the packet, a reserved data field 840-3, a protocol type data field 840-4 that indicates a protocol under which the packet is transmitted, and a packet counter data field 840-5 that indicates a packet counter value or a packet sequence value. In some embodiments, the packet counter data field can be used as a timestamp from a transmitting device or to determine if a particular packet is lost. In the embodiment depicted in FIG. 8, the packet type data field has a size of one bit. For example, a packet type value of 0 indicates that the packet is used in a point-to-point connection while a packet type value of 1 indicates that the packet is used in a point-to-multipoint connection or a broadcast connection. In another example, a packet type value of 1 indicates that the packet is used in a point-to-point connection while a packet type value of 0 indicates that the packet is used in a point-to-multipoint connection or a broadcast connection. Although the packet type data field is shown in FIG. 8 as having a size of one bit, in other embodiments, the packet type data field has a size of more than one bit. The payload includes payload data of M bytes (M being an integer greater than one) although one byte or less payload is also possible. The tail section 836 includes CRC 638 of one or more bits.

Communications between the sensor nodes 104-1, 104-2, . . . , 104-18, the communications nodes 106-1, 106-2, . . . , 106-10, and the ECUs 108-1, 108-2 can be characterized as "symmetrical" or "asymmetrical." In symmetrical communications, both communications devices transmit and receive data at the same data rate. For example, in an Ethernet-based point-to-point network both communications devices transmit and receive at, for example, 10 Gbps. In asymmetrical communications, communications in one direction, e.g., on the forward channel, occur at a higher rate than in the other direction, e.g., on the backward channel. For example, a high data rate is needed from one of the sensor nodes to a corresponding communications node or a corresponding ECU (e.g., the forward channel) but a much lower data rate is needed from a corresponding communications node or a corresponding ECU to one of the sensor nodes (e.g., the backward channel). An example use case for asymmetrical communications in an IVN may be a camera (e.g., a backup camera), where a high data rate is needed from the camera to a control/display ECU (e.g., the forward channel) but a much lower data rate is needed from the control/display ECU to the camera (e.g., the backward channel). For example, a high data rate is needed from the camera, C1, to the communication node 106-1 (e.g., the forward channel of a communications link 118-1) but a much lower data rate is needed from the communication node 106-1 to the camera, C1, (e.g., the backward channel of the communications link 118-1) and a high data rate is needed from the communication node 106-2 to the ECU 108-1 (e.g., the forward channel of a communications link 118-2) but a much lower data rate is needed from the ECU 108-1 to the communication node 106-2 (e.g., the backward channel of the communications link 118-2). Another example use case for asymmetrical communications in an IVN may be a LiDAR sensor or a radar, where a high data rate is needed from the LiDAR sensor or the radar to a control/display ECU (e.g., the forward channel) but a much lower data rate is needed from the control/display ECU to the LiDAR sensor or the radar (e.g., the backward channel). For example, a high data rate is needed from the radar, R1, to the communication node 106-3 (e.g., the forward channel of a communications link 118-3) but a much lower data rate is needed from the communication node 106-3 to the radar, R1, (e.g., the backward channel of the communications link 118-3) and a high data rate is needed from the communication node 106-3 to the ECU 108-3 (e.g., the forward channel of a communications link 118-4) but a much lower data rate is needed from the ECU 108-2 to the communication node 106-3, (e.g., the backward channel of the communications link 118-4).

Figure 9:
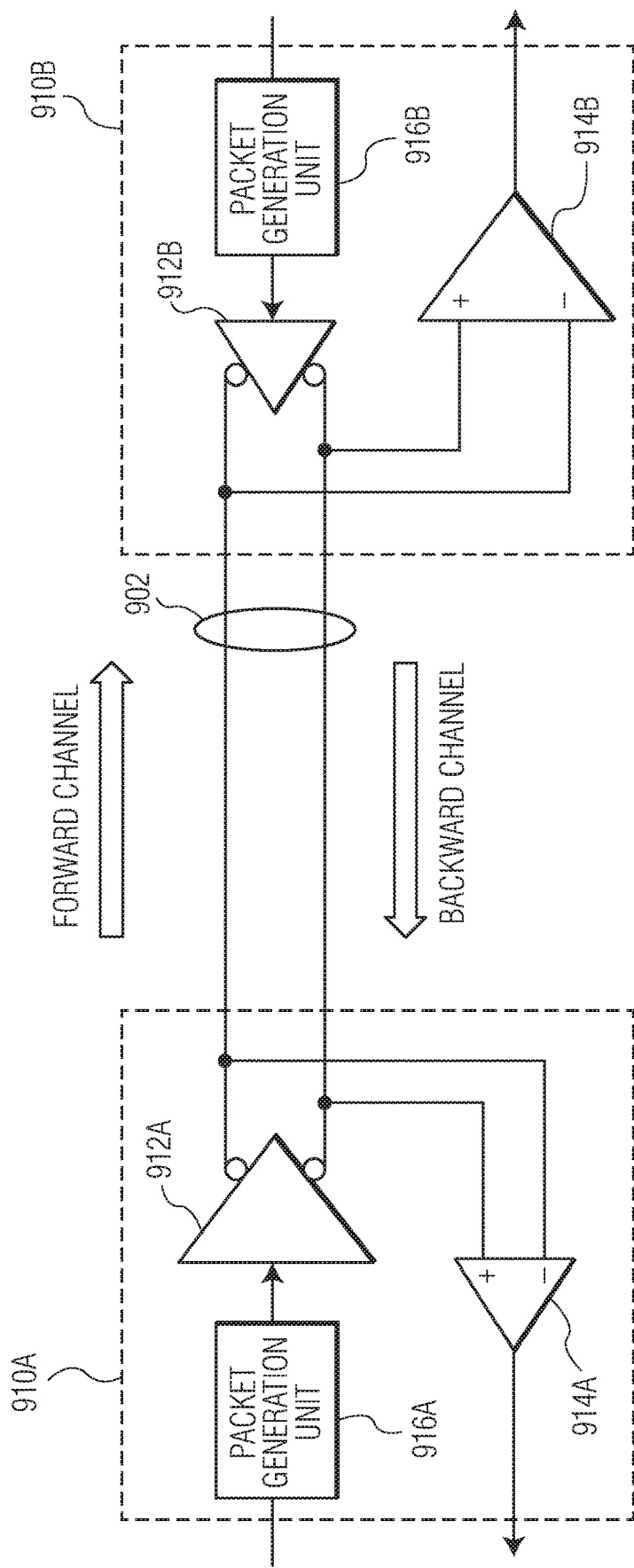
FIG. 9 depicts an example of asymmetrical communications within the communications network depicted in FIG. 1.

FIG. 9 depicts an example of asymmetrical communications over a transmission medium 902 between communication devices 910A, 910B. The communication devices 910A, 910B depicted in FIG. 9 are embodiments of the sensor nodes 104-1, 104-2, . . . , 104-18, the communications nodes 106-1, 106-2, . . . , 106-10, and/or the ECUs 108-1, 108-2 depicted in FIG. 1. However, the sensor nodes, the communications nodes, and/or the ECUs depicted in FIG. 1 is not limited to the embodiment shown in FIG. 9. In the embodiment depicted in FIG. 9, the communication device 910A includes a packet generation unit 916A, a transmitter 912A and a receiver 914A, while the communication device 910B includes a packet generation unit 916B, a transmitter 912B and a receiver 914B. In some embodiments, the packet generation units 916A, 916B are implemented in hardware (e.g., circuits), software, firmware, or a combination thereof. In an embodiment, at least one of the packet generation units 916A, 916B is implemented within a processor, such as a microcontroller, a host processor, a host, a digital signal processor (DSP), or a central processing unit (CPU). In some embodiments, at least one of the transmitters 912B, 912A and the receivers 914A, 914B is included within the PHY layer module of the communications device 910A or 910B. Although the communication devices 910A, 910B are depicted in FIG. 9 as being used for asymmetrical communications, in other embodiments, the communication devices 910A, 910B or at least some components (e.g., the packet generation units 916A, 916B, the transmitters 912B, 912A and/or the receivers 914A, 914B) of the communication devices 910A, 910B can be used for symmetrical communications. In the example of FIG. 9, the forward channel communicates at a higher data rate than the backward channel, e.g., 1 Gbps on the forward channel and 50 Mbps on the backward channel. In the example of FIG. 9, the capability of the transmitters 912B, 912A and the receivers 914A, 914B of the communication devices 910A, 910B in terms of data rate is represented by the different relative sizes of the transmitters and receivers. In particular, the transmitter 912A and the receiver 914B, which support the forward channel, are a first size and the transmitter 912B and the receiver 914A, which support the backward channel, are a second, smaller, size. In an example configuration as shown in FIG. 9, it is often the case that the lower speed receiver, e.g., receiver 914A, is less complex than the higher speed receiver, e.g., receiver 914B. For example, the less complex receiver may include less complex signal processing blocks and/or the scale of the signal processing blocks may be smaller to support a lower data rate. In an embodiment, receiver complexity can be characterized by factors such as: 1) the number of taps of the equalizer and/or echo canceller (e.g., as the data rate increases, the number of taps also increases, which results in a near exponential increase in hardware complexity); 2) a higher data rate typically requires a high sampling clock rate for the analog-to-digital converter (ADC), which requires more silicon area and more power consumption; 3) a higher data rate typically corresponds to a greater susceptibility to noise and interference, which typically requires additionally processing capability to implement error correction; and/or 4) a higher data rate typically requires more complex digital signal processing blocks to recover data at an acceptable bit error rate.

In some embodiments, each of the packet generation units 916A, 916B is configured to generate a data packet for communications in a wired communications network. The data packet may include a header and a payload, and the header may include packet type information that indicates a network connection (e.g., the forward channel or the backward channel) within the wired communications network in which the packet is used. In these embodiments, the transmitters 912B, 912A are configured to transmit generated packets through the network connection. The packet type information may indicate that the packet is used in a point-to-point network connection within the wired communications network or a point-to-multipoint connection within the wired communications network. In some embodiments, the packet type information indicates that the packet is used in the point-to-point network connection within the wired communications network, and the header includes no address information associated with the packet. In some other embodiments, the packet type information indicates that the packet is used in the point-to-multipoint network connection within the wired communications network, and the header includes address information associated with the packet. For example, the address information associated with the packet includes a source address of the packet and/or a destination address of the packet. In some embodiments, the packet type information is stored in a packet type data field of the header, and the packet type data field has a size of a single bit. The header may further include protocol type information that indicates a communications protocol according to which the packet is transmitted, priority information that indicates a priority level of the packet, and/or network cluster information that indicates to which network cluster within the wired communications network the packet is transmitted (e.g., each communications device allocated to the network cluster communicates according to a unique communications protocol). In some embodiments, the network connection is an asymmetrical connection such that communications in a first direction (e.g., the forward channel) of the network connection occur at a first rate that is higher than a second rate at which communications in a second direction (e.g., the backward channel) of the network connection occurs, and the first direction is opposite to the second direction.

Figure 10:
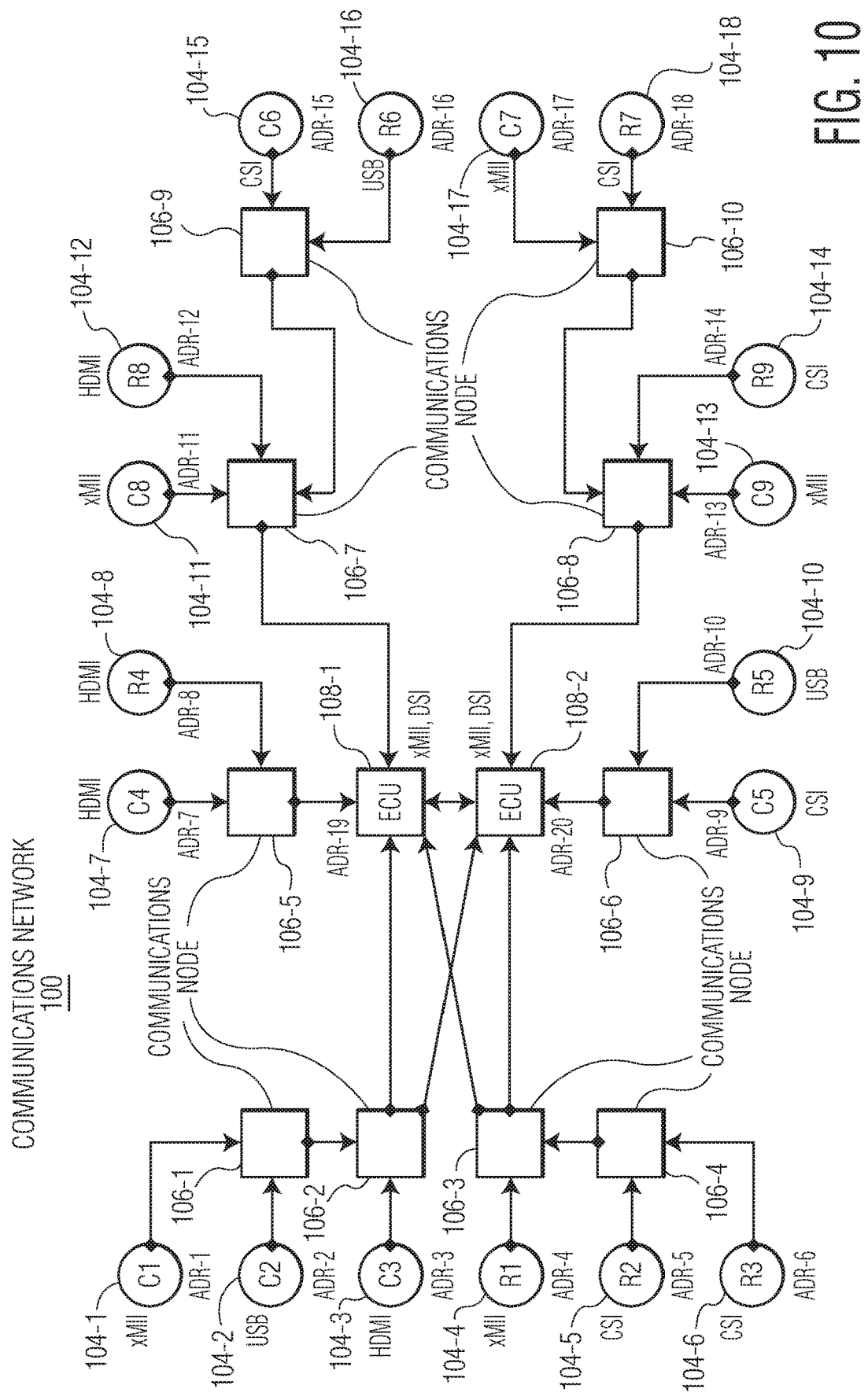
FIG. 10 depicts an address assignment for the communications network depicted in FIG. 1.

In some embodiments, each of the sensor nodes 104-1, 104-2, . . . , 104-18 and the ECUs 108-1, 108-2 depicted in FIG. 1 is assigned a unique address. However, in these embodiments, the communications nodes 106-1, 106-2, . . . , 106-10 are not assigned addresses because the communications nodes are intermediary nodes in communications and are not destination nodes in communications. FIG. 10 depicts such an address assignment for the communications network 100 depicted in FIG. 1. In the embodiment depicted in FIG. 10, the eighteen sensor nodes 104-1, 104-2, . . . , 104-18 communicate according to various communications protocols, such as, Universal Serial Bus (USB), xMII, CSI, High-Definition Multimedia Interface (HDMI) and are assigned eighteen unique addresses. The ECUs 108-1, 108-2 communicate according to xMII and DSI protocols and are assigned two unique addresses. However, protocols according to which the sensor nodes and the ECUs communicate are not limited to the protocols shown in FIG. 10. In total, the communications network has twenty unique addresses ADR-1, ADR-2, . . . , ADR-20, and, consequently, each data packet needs an address field of at least five bits in the header.

Figure 11:
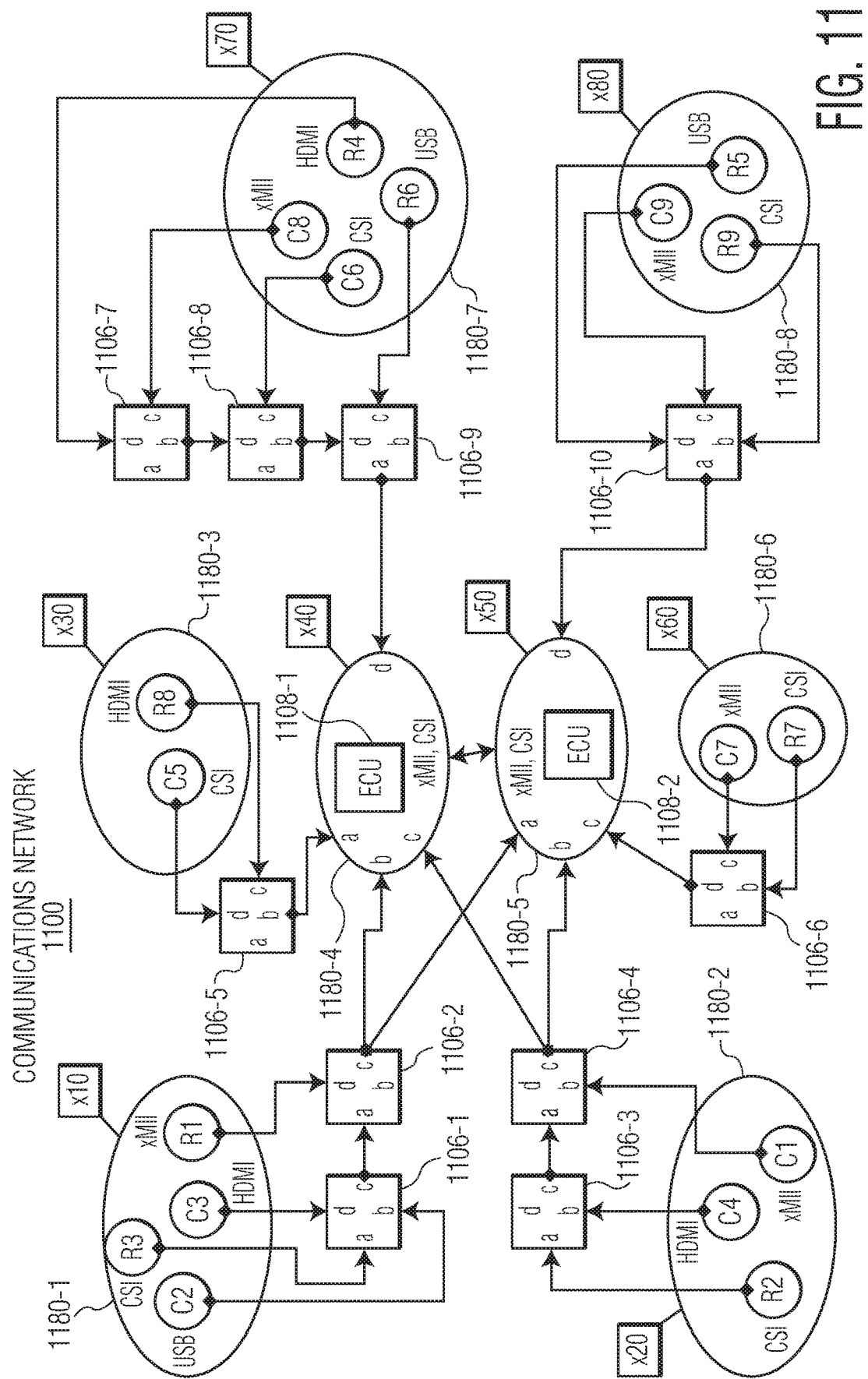
FIG. 11 depicts an address assignment for a communications network.

Reducing the size of an address field in a packet header can reduce communications overhead, and consequently, can reduce power consumption in a communications network. For example, in a communications network (e.g., an IVN) where power supply and communications bandwidth are limited, reducing the address field in a packet header is important to the operation of the communications network. In some embodiments, sensor nodes, communications nodes, and/or ECUs of a communications network are assigned to different clusters in which each cluster has a unique address. For example, sensor nodes and ECUs of a communications network are assigned to different clusters in which each cluster has a unique address. Compared to an address assignment scheme in which each sensor node or ECU is assigned a unique address, clustering sensor nodes and ECUs into different clusters can reduce the number of unique addresses required for communications and can reduce power consumption in a communications network. FIG. 11 depicts an address assignment for a communications network 1100. In the embodiment depicted in FIG. 11, the communications network 1100 include sensor nodes C1, C2, C3, C4, C5, C6, C7, C8, C9, C9, R1, R2, R3, R4, R5, R6, R7, R8, and R9, communications nodes 1106-1, 1106-2, . . . , 1106-10, and ECUs 1108-1, 1108-2. The sensor nodes, C1, C2, C3, C4, C5, C6, C7, C8, C9, C9, R1, R2, R3, R4, R5, R6, R7, R8, and R9, communicate according to various communications protocols, such as, USB, xMII, CSI, HDMI and are assigned to six different clusters 1180-1, 1180-2, 1180-3, 1180-6, 1180-7, 1180-8 in which sensor nodes in each cluster has the same unique address. In the embodiment depicted in FIG. 11, each of these clusters contains sensor nodes that communicate according to different protocols and each cluster does not contain two or more sensors that communicate according to the same protocol. For example, the cluster 1180-1 has an address of x10 and contains sensor nodes, C2, C3, R1, R3 that communicate according to USB, HDMI, xMII, and CSI protocols, respectively, the cluster 1180-2 has an address of x20 and contains sensor nodes, C1, C4, R2, that communicate according to xMII, HDMI, and CSI protocols, respectively, the cluster 1180-3 has an address of x30 and contains sensor nodes, C5, R8, that communicate according to CSI and HDMI protocols, respectively, the cluster 1180-6 has an address of x60 and contains sensor nodes, C7, R7, that communicate according to xMII and CSI protocols, respectively, the cluster 1180-7 has an address of x70 and contains sensor nodes, C6, C8, R4, R6 that communicate according to CSI, xMII, HDMI, and USB protocols, respectively, and the cluster 1180-8 has an address of x10 and contains sensor nodes, C9, R5, R9 that communicate according to xMII, USB, and CSI protocols, respectively. In some embodiments, a cluster may contain only one sensor node. In some embodiments, a sensor node is assigned a unique address if the sensor node does not belong to a cluster. The ECUs 1108-1, 1108-2 communicate according to xMII and CSI protocols and are assigned to two clusters. For example, the ECU 1108-1 is included in cluster 1180-4 and has an address of x40 and communicates according xMII, and CSI protocols through different ports, and the ECU 1108-2 is included in cluster 1180-5 and has an address of x50 and communicates according xMII, and CSI protocols through different port. However, protocols according to which the sensor nodes and the ECUs communicate and the cluster assignment of the sensor nodes, C1, C2, C3, C4, C5, C6, C7, C8, C9, C9, R1, R2, R3, R4, R5, R6, R7, R8, and R9, and the ECUs 1108-1, 1108-2 are not limited to the protocols and the cluster assignment shown in FIG. 11. In the embodiment depicted in FIG. 11, the communications network includes eight clusters with eight unique addresses, and, consequently, each data packet needs an address field of at least three bits in the header. In the address assignment scheme described with reference to FIG. 10, each data packet needs an address field of at least five bits in the header. Comparing to an address technique that assigns a unique address to each sensor node and each ECUs, clustering sensor nodes and ECUs into different clusters and assigning unique addresses to the clusters can reduce the size of the address field in each data packet. Consequently, clustering sensor nodes and ECUs into different clusters and assigning unique addresses to the clusters can reduce power consumption in the communications network.

In the embodiment depicted in FIG. 11, each of the communications nodes 1106-1, 1106-2, . . . , 1106-10 includes multiple ports, (a), (b), (c), (d), which are connected to corresponding sensor nodes through different protocols (e.g., CSI, xMII, HDMI, and USB). Each time a packet is received at a communication node through a specific port, the communication node decides to which port that the received packet is forwarded. In some embodiments, the communication node decides to which port that the received packet is forwarded using a port-to-protocol lookup table.

FIG. 12 depicts a port-to-protocol lookup table 1200 that can be used for packet forwarding in the communications network 1100 depicted in FIG. 11. For example, the port-to-protocol lookup table can be used by the communications node 1106-1 depicted in FIG. 11. As depicted in FIG. 12, the port-to-protocol lookup table contains protocols entries for four communications ports, port(a), port(b), port(c), port(d). Specifically, the communications protocol according to which data is transmitted through port(a) is CSI, the communications protocol according to which data is transmitted through port(b) is USB, and the communications protocol according to which data is transmitted through port(c) is HDMI. Port(d) is connected to other communications node (e.g., the communications node 1106-2 in FIG. 12).

In an example of the operation of the communications network 1100 depicted in FIG. 11, the ECU 1108-1 in cluster 1180-4 transmits a data packet to the sensor node, R3, in cluster 1180-1. Specifically, the ECU 1108-1 sends a packet with a destination address x10 in an address field within the header of the packet and a protocol type of CSI in a packet protocol data field within the header of the packet. The ECU 1108-1 checks its port-to-protocol lookup table and transmits the packet from port(b). The data arrives at port(c) of the communications node 1106-2. The communications nodes 1106-1, 1106-2 know which protocols are attached to which ports based on their port-to-protocol lookup tables (e.g., the port-to-protocol lookup table 1200 depicted in FIG. 12). Consequently, the communications node 1106-2 forwards the packet to the communications node 1106-1. The communications node 1106-1 forwards the packet to the sensor node, R3, in cluster 1180-1 through port(a).

Figure 13:
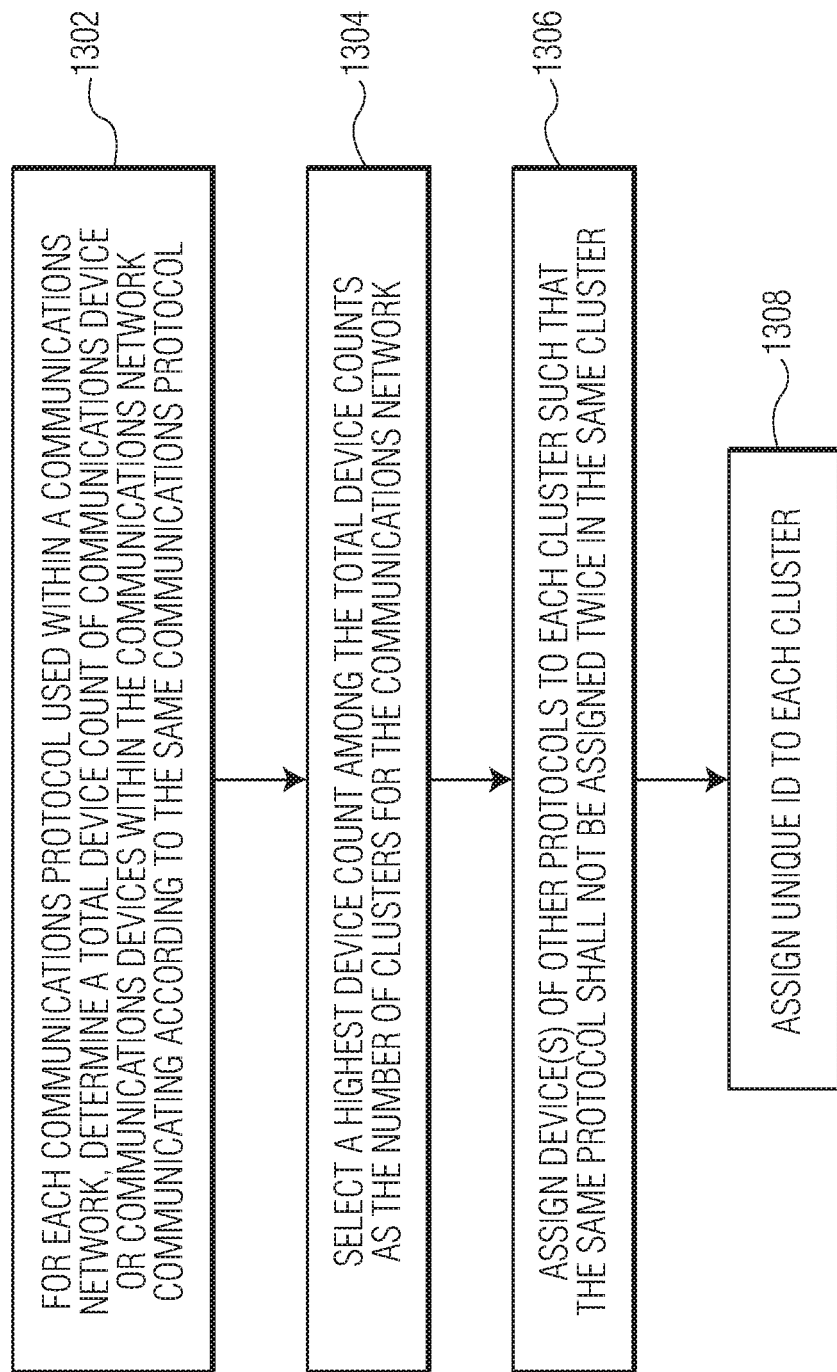
FIG. 13 is a process flow diagram of a method for clustering in accordance to an embodiment of the invention.

FIG. 13 is a process flow diagram of a method for clustering or network partition in accordance to an embodiment of the invention. According to the method, at block 1302, for each communications protocol used within a communications network, a total device count of communications device or communications devices within the communications network communicating according to the same communications protocol is determined. For example, in the communications network 1100 depicted in FIG. 11, the total number of communications devices communicate according to HDMI is four, the total number of communications devices communicate according to CSI is eight, the total number of communications devices communicate according to USB is three, and the total number of communications devices communicate according to xMII is seven. At block 1304, the highest device count among the total device counts is selected as the number of clusters for the communications network. For example, in the communications network 1100 depicted in FIG. 11, the total number of communications devices communicate according to CSI is eight, which is higher than the total number of communications devices communicate according to HDMI, the total number of communications devices communicate according to USB, and the total number of communications devices communicate according to xMII, and the total number of clusters is eight. One communications device that communicates according to a communications protocol with the highest device count is allocated to each of the clusters. For example, in the communications network 1100 depicted in FIG. 11, the sensor nodes R3, R2, C5, R7, C6, and R9 are allocated to clusters 1180-1, 1180-2, 1180-3, 1180-6, 1180-7, 1180-8, respectively, while the ECU 1108-1, 1108-2 are allocated to clusters 1180-4, 1180-5, respectively. At block 1006, device(s) of other protocols is/are allocated or assigned to each cluster such that the same protocol shall not be assigned twice in the same cluster. For example, in the communications network 1100 depicted in FIG. 11, each cluster includes devices that communications according to different protocols. At block 1308, a unique identification number is assigned to each cluster, and can be used as the address of the cluster.

Figure 14:
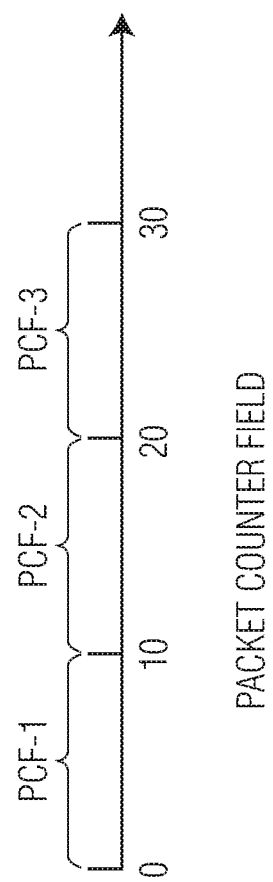
FIG. 14 depicts some examples of packet counter fields of packets that can be used in the communications network depicted in FIG. 11.

In some embodiments, in order to distinguish streams of same protocols from multiple clusters, the packet counter field of a packet is assigned a unique packet counter field range. FIG. 14 depicts some examples of packet counter fields PCF_1, PCF-2, PCF-3 of packets that can be used in the communications network 1100 depicted in FIG. 14. For example, cluster 1180-1 has a packet counter field PCF-1 that starts from 0 to 10, cluster 1180-2 has a packet counter field PCF-2 that starts from 11 to 20, and cluster 1180-3 has a packet counter field PCF-3 that starts from 21 to 30. Once a communications node receives a packet, the communications node investigates the packet counter field to identify a cluster from which the packet is received. Using a combination of packet type, packet counter, and address, a communications node can identify the origin and destination of a data stream.

Figure 15:
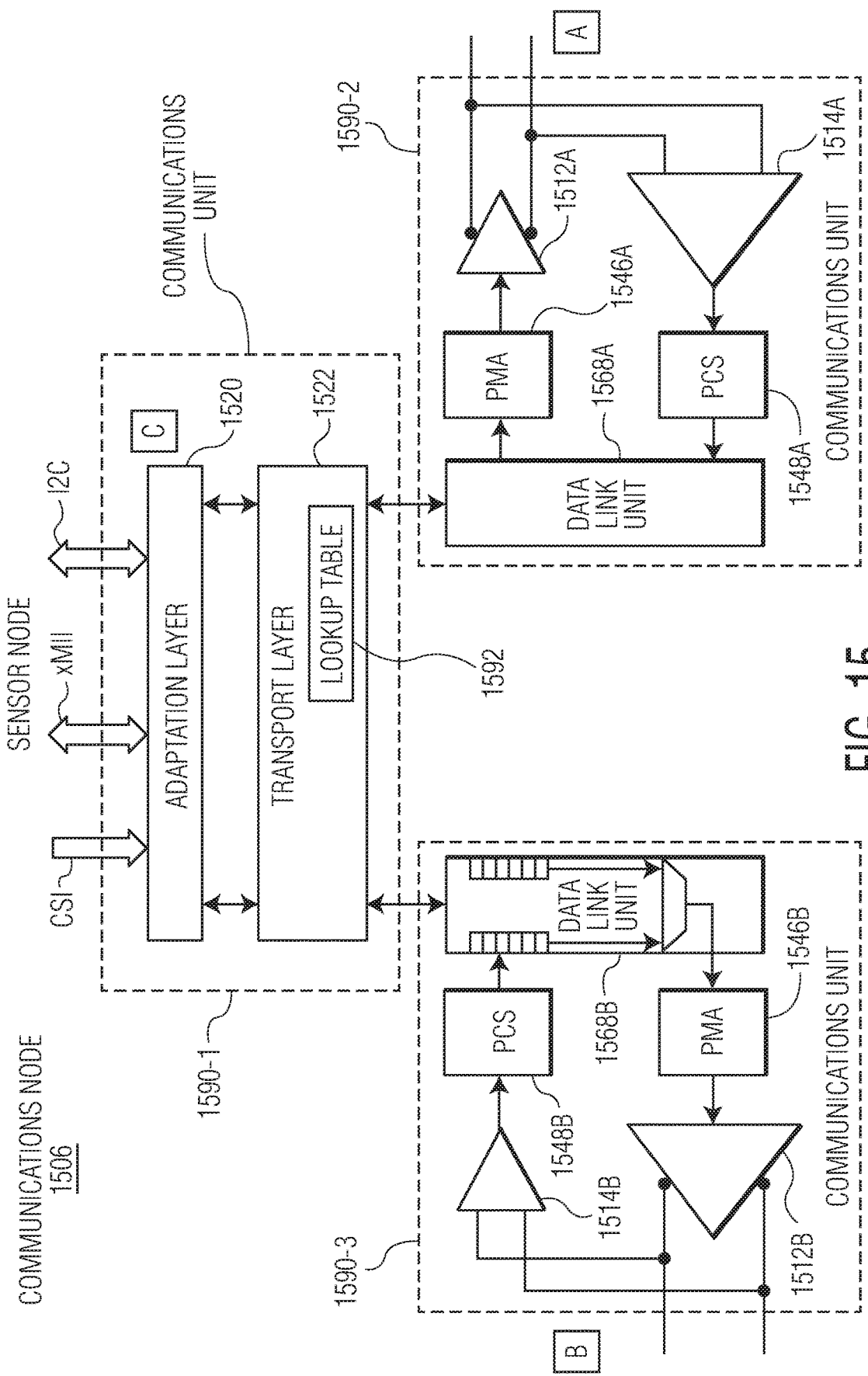
FIG. 15 depicts an embodiment of communications nodes depicted in FIG. 11.

FIG. 15 depicts a communications node 1506, which is an embodiment of the communications nodes 1106-1, 1106-2, . . . , 1106-10 depicted in FIG. 11. However, the communications nodes 1106-1, 1106-2, . . . , 1106-10 depicted in FIG. 11 are not limited to the embodiment shown in FIG. 15. In the embodiment depicted in FIG. 15, the communications node 1506 includes three ports, A, B, C, and three communications units 1590-1, 1590-2, 1590-3 for the three ports, A, B, C. However, the number of ports of the communications node is not limited to three. In some embodiments, the communications units are implemented in hardware (e.g., circuits), software, firmware, or a combination thereof. In the embodiment depicted in FIG. 15, the communications unit 1590-1 includes an adaption layer 1520 that is configured to adapt data of different protocols into a universal format and a transport layer 1532 with a port-to-cluster look-up table 1592. The communications unit 1590-2 includes a receiver 1514A, a transmitter 1512A, a physical medium attachment (PMA) 1546A, a physical coding sublayer (PCS) 1548A, and a data link unit 1568A configured to perform data link layer function. The communications unit 1590-3 includes a receiver 1514B, a transmitter 1512B, a PMA 1546B, a PCS 1548B, and a data link unit 1568B configured to perform data link layer function. In some embodiments, the communications unit 1590-2 or 1590-3 is configured to receive a packet at a first port, where a header of the packet includes an address of a destination cluster within a communications network and a communications protocol according to which a destination communications device in the destination cluster communicates, and based on the communications protocol and a port-to-protocol lookup table, transmit the packet or a payload within the packet from the first port to a second port to which the destination communications device is connected. In some embodiments, the communications unit 1590-1 is configured to extract the payload within the packet and create a second packet in accordance with the communications protocol using the payload.

Figure 16:
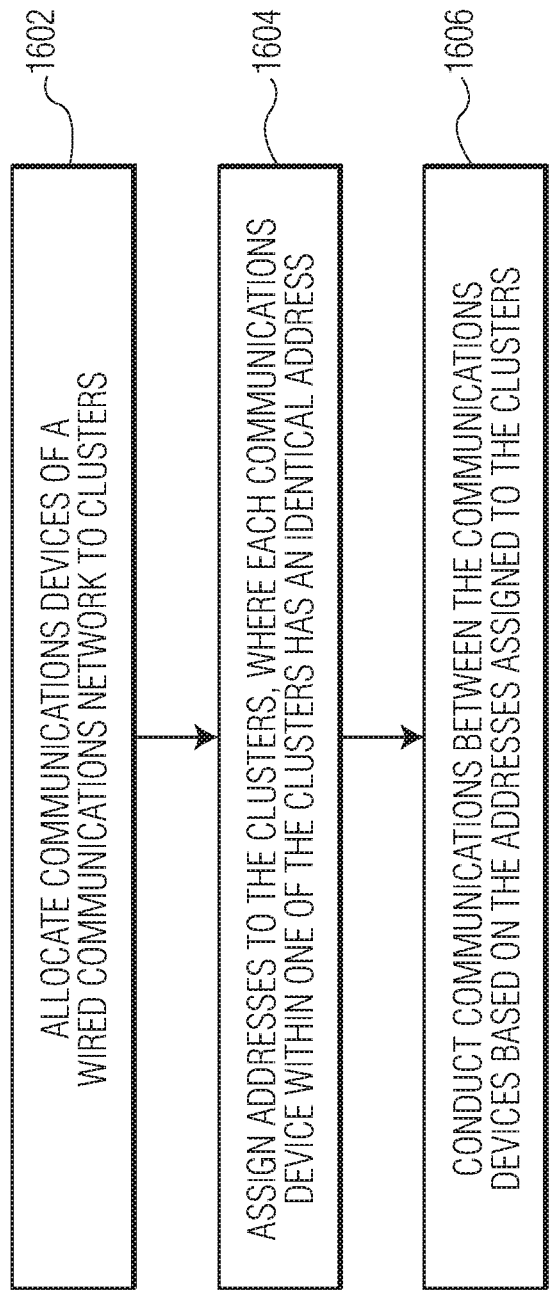
FIG. 16 is a process flow diagram of a method of communications in accordance to an embodiment of the invention.

FIG. 16 is a process flow diagram of a method of communications in accordance to an embodiment of the invention. According to the method, at block 1602, communications devices of a wired communications network are allocated to clusters. At block 1604, addresses are assigning to the clusters, where each communications device within one of the clusters has an identical address. At block 1606, communications are conducted between the communications devices based on the addresses assigned to the clusters. The communications devices may be similar to, the same as, or a component of the sensor nodes 104-1, 104-2, . . . , 104-18 and/or the ECUs 108-1, 108-2 depicted in FIG. 1, the communications device 210 depicted in FIG. 2, the communication devices 910A, 910B depicted in FIG. 9, and/or the sensor nodes, C1, C2, C3, C4, C5, C6, C7, C8, C9, C9, R1, R2, R3, R4, R5, R6, R7, R8, and R9, and/or ECUs 1108-1, 1108-2 depicted in FIG. 11.

Figure 17:
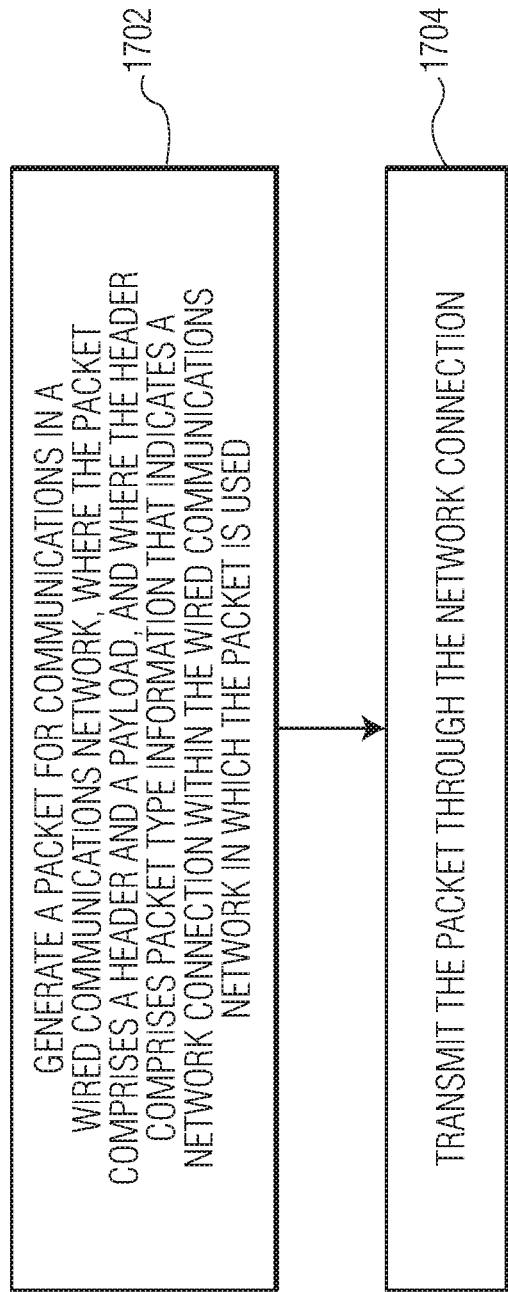
FIG. 17 is a process flow diagram of a method of communications in accordance to another embodiment of the invention.

FIG. 17 is a process flow diagram of a method of communications in accordance to another embodiment of the invention. According to the method, at block 1702, a packet for communications in a wired communications network is generated, where the packet includes a header and a payload, and where the header includes packet type information that indicates a network connection within the wired communications network in which the packet is used. At block 1704, the packet is transmitted through the network connection. The wired communications network may be similar to, the same as, or a component of the communications network 100 depicted in FIG. 1 and/or the communications network 1100 depicted in FIG. 11.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of communications, the method comprising:
   allocating a plurality of communications devices of a wired communications network to a plurality of clusters such that no more than one communications device in the plurality of communication devices configured to use a particular communications protocol is allocated to a particular cluster in the plurality of clusters;
   assigning a plurality of addresses to the clusters, wherein each communications device within one of the clusters has an identical address; and
   conducting communications between the communications devices based on the addresses assigned to the clusters.

2. The method of claim 1, wherein each of the communications devices allocated to each of the clusters communicates according to a unique communications protocol.

3. The method of claim 2, wherein at least one of the clusters comprises at least two of the communications devices that communicate according to different communications protocols.

4. The method of claim 2, wherein at least one of the clusters comprises an electronic control unit (ECU), and wherein the wired communications network is an in-vehicle network (IVN).

5. The method of claim 1, wherein allocating the communications devices of the wired communications network to the clusters comprises, for each of a plurality of communications protocols used within the wired communications network, determining a total device count of communications device or communications devices within the wired communications network communicating according to the same communications protocol.

6. The method of claim 5, wherein allocating the communications devices of the wired communications network to the clusters further comprises selecting a highest device count among the total device counts as the number of clusters for the wired communications network.

7. The method of claim 6, wherein assigning the addresses to the clusters comprises assigning a unique identification number to each of the clusters.

8. The method of claim 6, wherein allocating the communications devices of the wired communications network to the clusters further comprises allocating, to each of the clusters, one communications device that communicates according to a communications protocol with the highest device count.

9. The method of claim 8, wherein allocating the communications devices of the wired communications network to the clusters further comprises allocating, to at least one of the clusters, a second communications device that communicates according to a second communications protocol, and wherein the second communications protocol is different from the communications protocol with the highest device count.

10. The method of claim 1, wherein conducting communications between the communications devices based on the addresses assigned to the clusters comprises receiving a packet from a first cluster of the clusters at a first port of one of the communications devices, and wherein a header of the packet comprises an address of a second cluster of the clusters and a communications protocol according to which a destination communications device in the second cluster communicates.

11. The method of claim 10, wherein conducting communications between the communications devices based on the addresses assigned to the clusters further comprises, based on the communications protocol and a port-to-protocol lookup table, transmitting the packet or a payload within the packet from the first port to a second port of the one of the communications devices to which the destination communications device is connected.

12. The method of claim 1, wherein conducting communications between the communications devices based on the addresses assigned to the clusters comprises conducting communications between the communications devices based on the addresses assigned to the clusters asymmetrically such that communications in one direction occur at a first rate that is higher than a second rate at which communications in an opposite direction occurs.

13. A communications device comprising:
   a plurality of ports; and
   at least one communications unit configured to:
      at a first port of the ports, receive a packet, wherein a header of the packet comprises an address of a destination cluster within a communications network and a communications protocol according to which a destination communications device in the destination cluster communicates; and
      based on the communications protocol and a port-to-protocol lookup table, transmit the packet or a payload within the packet from the first port to a second port of the ports to which the destination communications device is connected.

14. The communications device of claim 13, wherein the at least one communications unit is further configured to:
   extract the payload within the packet; and
   create a second packet in accordance with the communications protocol using the payload.

15. A wired communications network comprising:
   a wired transmission media; and
   a plurality of communications devices configured to communicate via the wired transmission media, wherein the communications devices are allocated to a plurality of clusters, wherein each of the communications devices allocated to one of the clusters communicates according to a unique communications protocol, wherein a plurality of addresses are assigned to the clusters, wherein each communications device within each of the clusters has an identical address, and wherein communications are conducted between the communications devices based on the addresses assigned to the clusters.

16. The wired communications network of claim 15, wherein at least one of the clusters comprises at least two of the communications devices that communicate according to different communications protocols.

17. The wired communications network of claim 15, wherein at least one of the clusters comprises an electronic control unit (ECU) of the communications devices, and wherein the wired communications network is an in-vehicle network (IVN).

18. The wired communications network of claim 15, wherein at least one of the communications devices is configured to, at a first port, receive a packet from a first cluster of the clusters, and wherein a header of the packet comprises an address of a second cluster of the clusters and a communications protocol according to which a destination communications device in the second cluster communicates.

19. The wired communications network of claim 18, wherein the at least one of the communications devices is further configured to, based on the communications protocol and a port-to-protocol lookup table, transmit the packet or a payload within the packet from the first port to a second port of the at least one of the communications devices to which the destination communications device is connected.

20. The wired communications network of claim 15, wherein communications is conducted in the wired communications network asymmetrically such that communications in one direction occur at a first rate that is higher than a second rate at which communications in an opposite direction occurs.

* * * * *